US008589953B1

(12) United States Patent
Havemose

(10) Patent No.: US 8,589,953 B1
(45) Date of Patent: *Nov. 19, 2013

(54) SYSTEM AND METHOD FOR TRANSPARENT CONSISTENT APPLICATION-REPLICATION OF MULTI-PROCESS MULTI-THREADED APPLICATIONS

(75) Inventor: Allan Havemose, Arroyo Grande, CA (US)

(73) Assignee: Open Invention Network, LLC, Durham, NC (US)

( * ) Notice: Subject to any disclaimer, the term of this patent is extended or adjusted under 35 U.S.C. 154(b) by 274 days.

This patent is subject to a terminal disclaimer.

(21) Appl. No.: 12/851,706

(22) Filed: Aug. 6, 2010

(51) Int. Cl.
*G06F 13/00* (2006.01)
*G06F 7/00* (2006.01)

(52) U.S. Cl.
USPC .......................... 719/319; 707/610; 711/162

(58) Field of Classification Search
USPC .......................... 707/610; 711/162; 719/319
See application file for complete search history.

(56) References Cited

U.S. PATENT DOCUMENTS

| | | | |
|---|---|---|---|
| 5,621,885 A * | 4/1997 | Del Vigna, Jr. ................ 714/13 |
| 5,754,752 A | 5/1998 | Sheh et al. |
| 5,951,695 A | 9/1999 | Kolovson |
| 6,035,415 A | 3/2000 | Fleming |
| 6,266,781 B1 | 7/2001 | Chung et al. |
| 6,266,785 B1 | 7/2001 | McDowell |
| 6,317,844 B1 | 11/2001 | Kleiman |
| 6,580,898 B1 | 6/2003 | Oguri |
| 6,622,261 B1 | 9/2003 | Laranjeira et al. |
| 6,625,751 B1 | 9/2003 | Starovic et al. |
| 6,687,849 B1 | 2/2004 | Cherf |
| 6,928,577 B2 | 8/2005 | Moser et al. |
| 7,076,687 B2 | 7/2006 | Fujibayashi et al. |
| 7,228,452 B2 | 6/2007 | Moser et al. |
| 7,321,906 B2 | 1/2008 | Green |
| 7,363,534 B1 | 4/2008 | Krishnamurthy et al. |
| 7,418,462 B2 | 8/2008 | Lomet et al. |
| 7,478,273 B2 | 1/2009 | Nakamura et al. |
| 7,620,710 B2 | 11/2009 | Kottomtharayil et al. |
| 7,725,763 B2 | 5/2010 | Vertes et al. |
| 7,873,805 B2 | 1/2011 | Obernuefemann |
| 7,890,469 B1 * | 2/2011 | Maionchi et al. ............ 707/654 |
| 7,983,190 B2 | 7/2011 | Hirota |
| 8,010,495 B1 | 8/2011 | Kuznetzov et al. |
| 8,051,324 B1 | 11/2011 | Zhao et al. |
| 2002/0133738 A1 * | 9/2002 | Zeigler et al. .................... 714/6 |
| 2004/0034808 A1 | 2/2004 | Day, III et al. |
| 2004/0078618 A1 * | 4/2004 | Moser et al. .................... 714/3 |
| 2004/0078625 A1 | 4/2004 | Rampuria et al. |
| 2004/0103342 A1 | 5/2004 | Moser et al. |
| 2005/0066056 A1 | 3/2005 | Dominic |
| 2005/0157741 A1 | 7/2005 | Wu et al. |

(Continued)

*Primary Examiner* — Charles E Anya
(74) *Attorney, Agent, or Firm* — Haynes and Boone, LLP

(57) ABSTRACT

A system, method, and computer readable medium for consistent and transparent replication of multi process multi threaded applications. The computer readable medium includes computer-executable instructions for execution by a processing system. Primary applications runs on primary hosts and one or more replicated instances of each primary application run on one or more backup hosts. Replica consistency between primary application and its replicas is provided by imposing the execution ordering of the primary on all its replicas. The execution ordering on a primary is captured by intercepting calls to the operating system and libraries, sending replication messages to its replicas, and using interception on the replicas to enforce said captured primary execution order. Replication consistency is provided without requiring modifications to the application, operating system or libraries.

20 Claims, 10 Drawing Sheets

(56) References Cited

U.S. PATENT DOCUMENTS

| | | |
|---|---|---|
| 2005/0165861 A1 | 7/2005 | Christie et al. |
| 2005/0251785 A1* | 11/2005 | Vertes et al. ............... 717/105 |
| 2006/0053263 A1 | 3/2006 | Prahlad et al. |
| 2006/0209895 A1 | 9/2006 | Hirota |
| 2007/0143497 A1 | 6/2007 | Kottomtharayil et al. |
| 2008/0005509 A1* | 1/2008 | Smith et al. ............... 711/162 |
| 2008/0077686 A1 | 3/2008 | Subhraveti |
| 2008/0104443 A1* | 5/2008 | Akutsu et al. ............... 714/6 |
| 2008/0133646 A1 | 6/2008 | Azulai |
| 2009/0103342 A1 | 4/2009 | Lin |
| 2009/0177915 A1 | 7/2009 | Dominic |
| 2010/0030818 A1 | 2/2010 | Cooper et al. |
| 2010/0161550 A1* | 6/2010 | Jiang et al. ............... 707/610 |
| 2010/0274984 A1 | 10/2010 | Inomata et al. |
| 2010/0325485 A1 | 12/2010 | Kamath et al. |
| 2011/0167196 A1 | 7/2011 | Scales et al. |
| 2011/0167298 A1 | 7/2011 | Lee |
| 2011/0276620 A1 | 11/2011 | Pirzada et al. |

\* cited by examiner

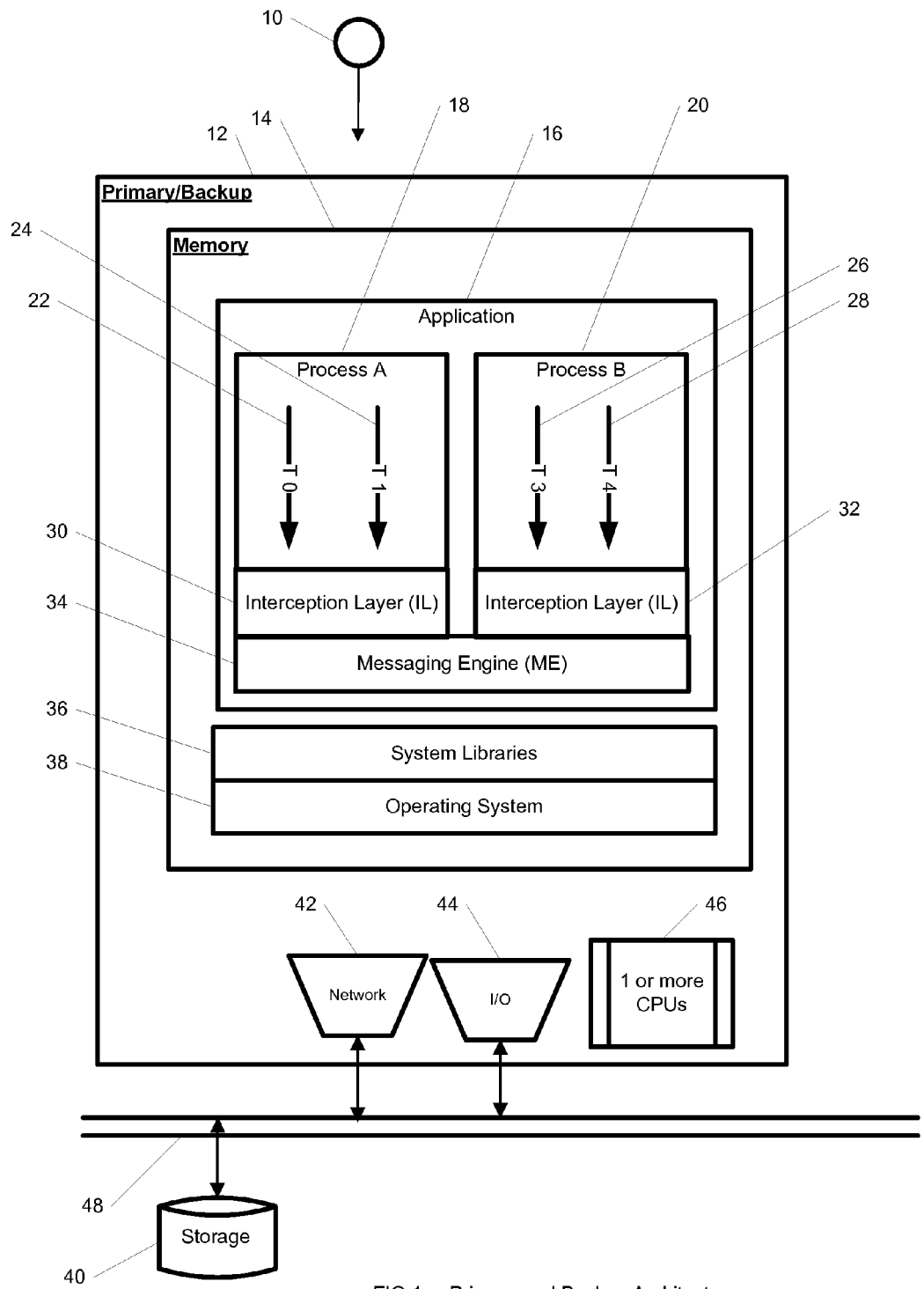
FIG.1 – Primary and Backup Architecture

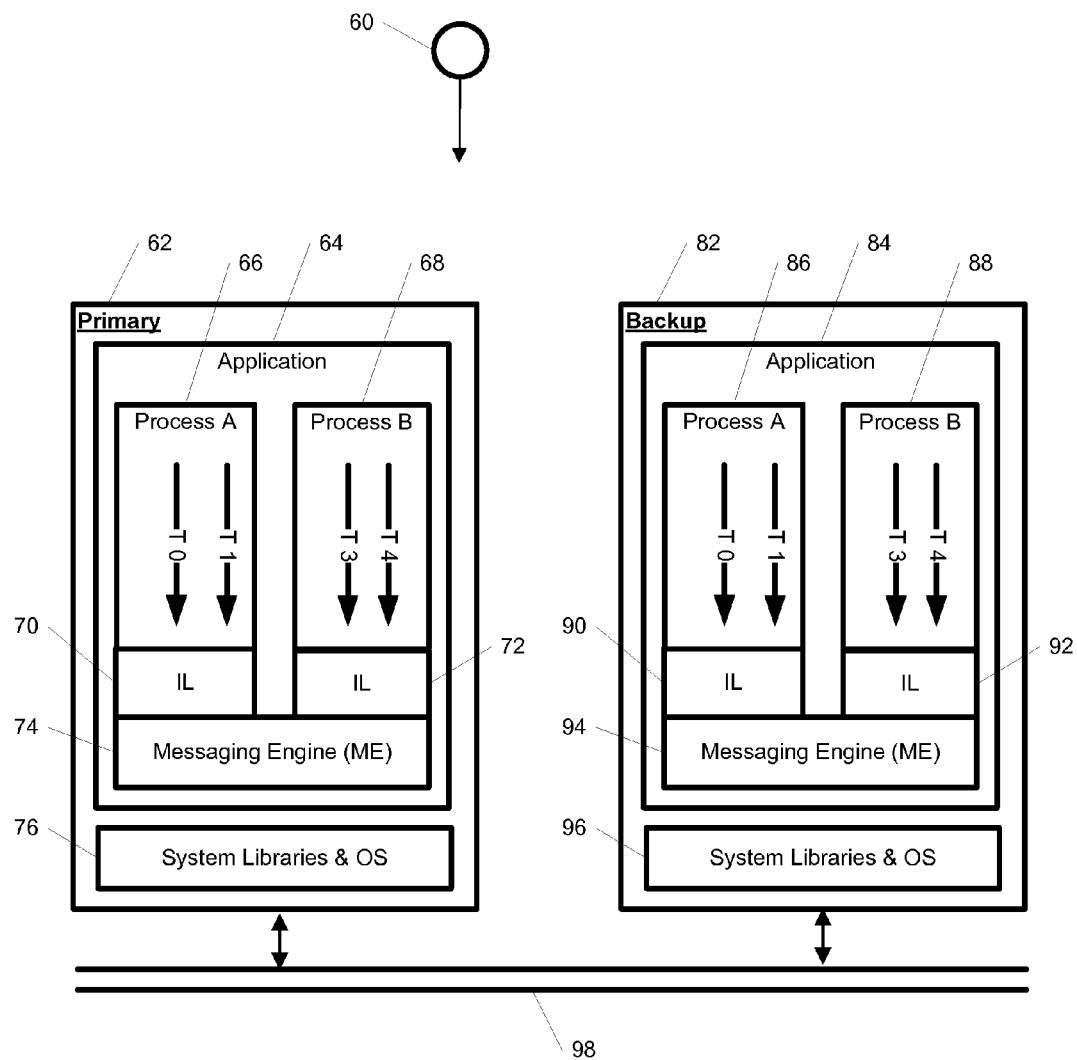
FIG.2 – Primary and Backup Pair

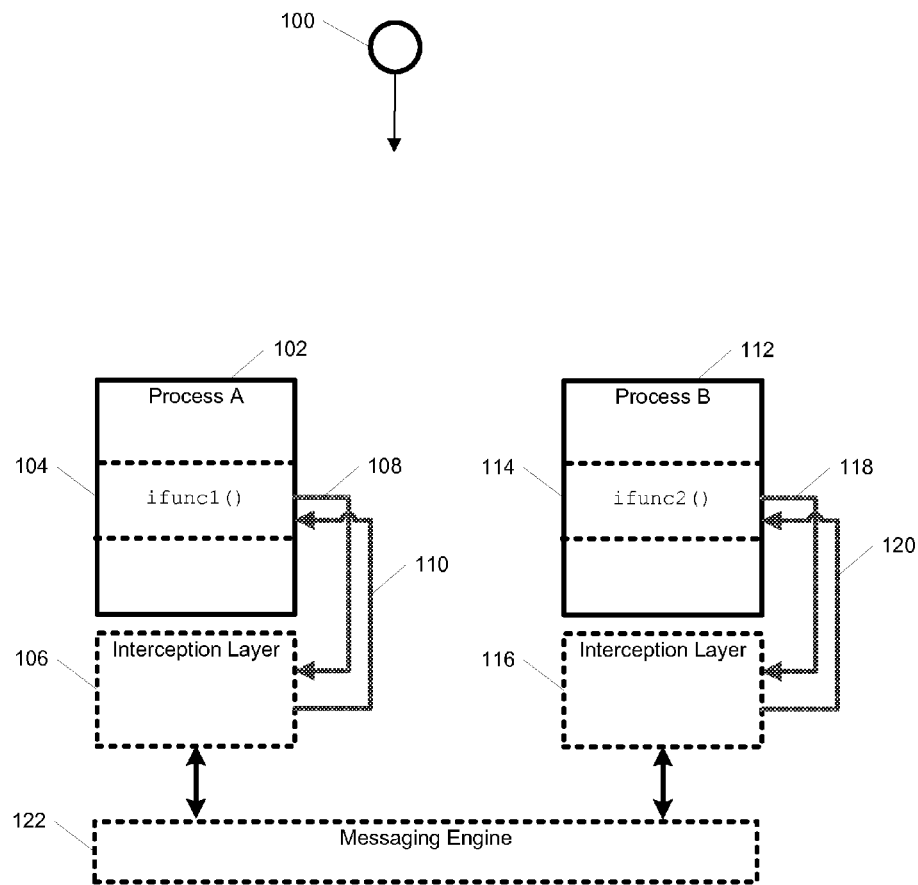
FIG.3 – Interception

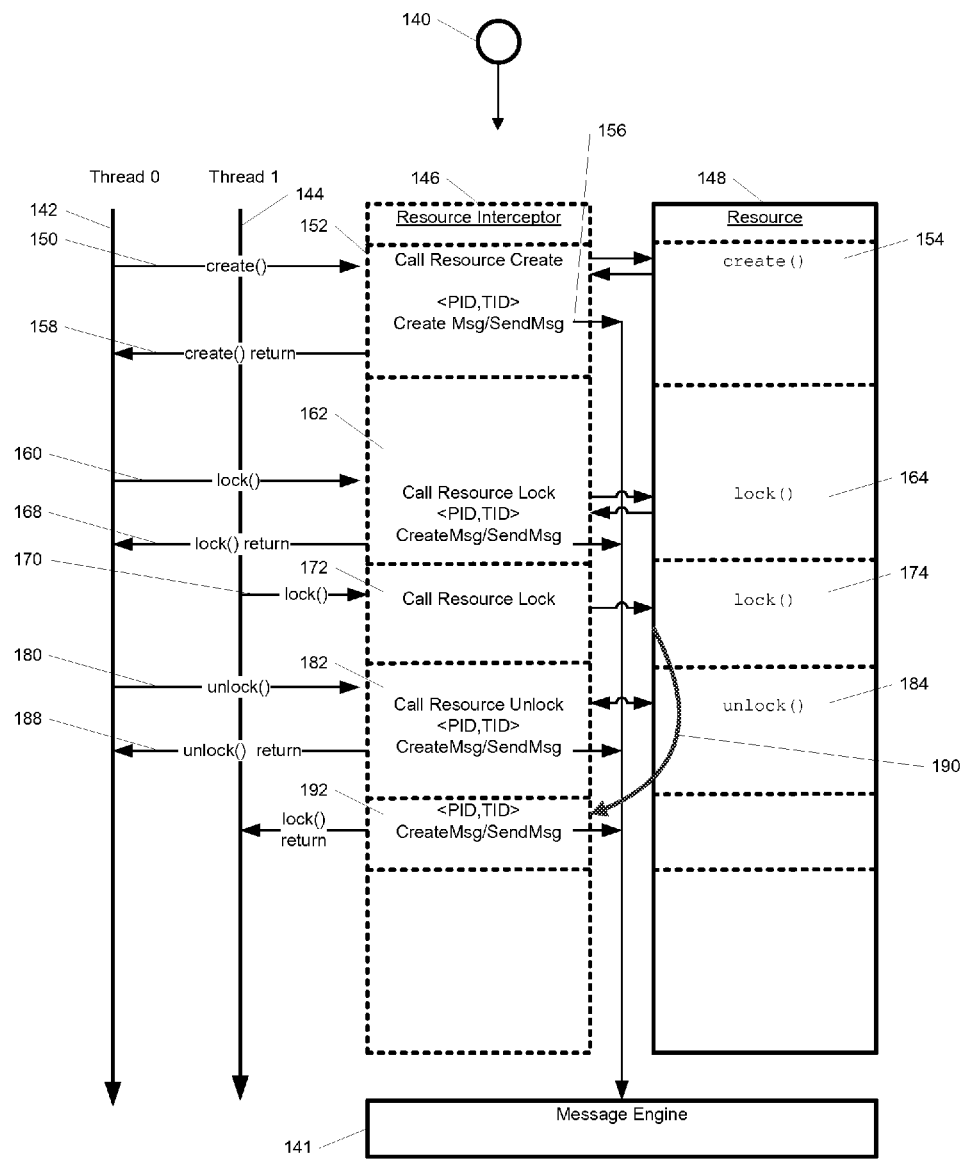
FIG.4 — Creation Replication Messages by Primary

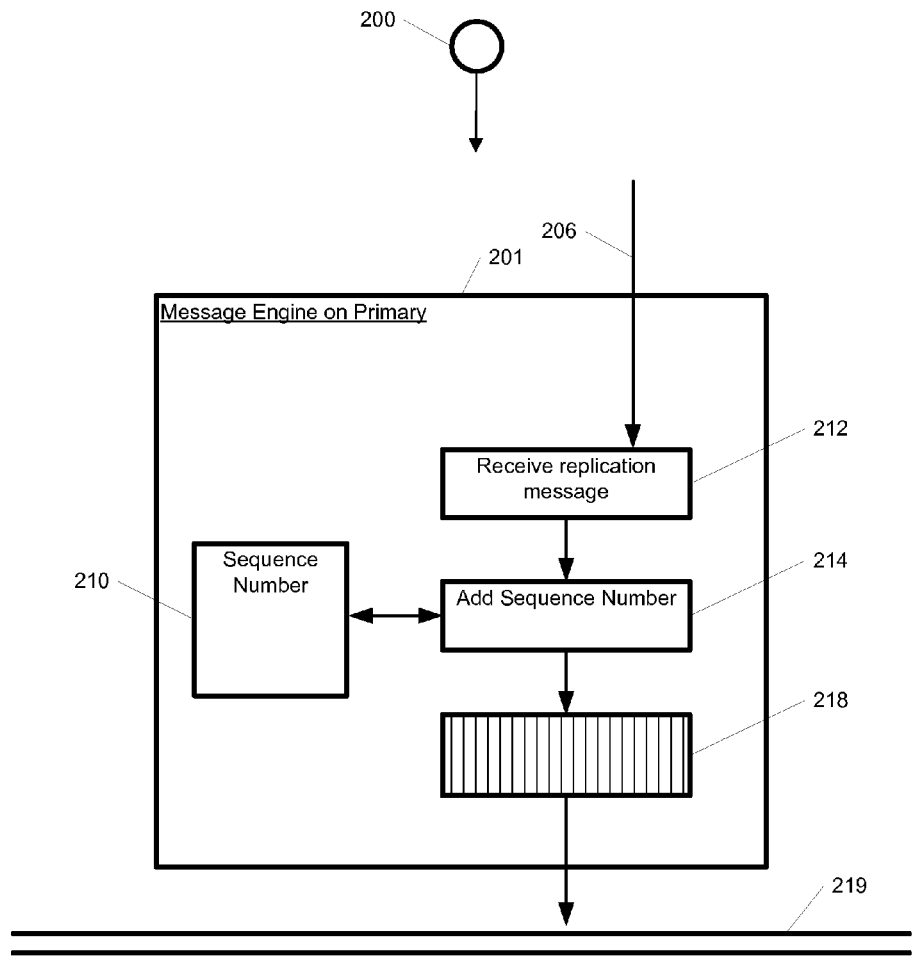
FIG.5 – Primary's Messaging Engine

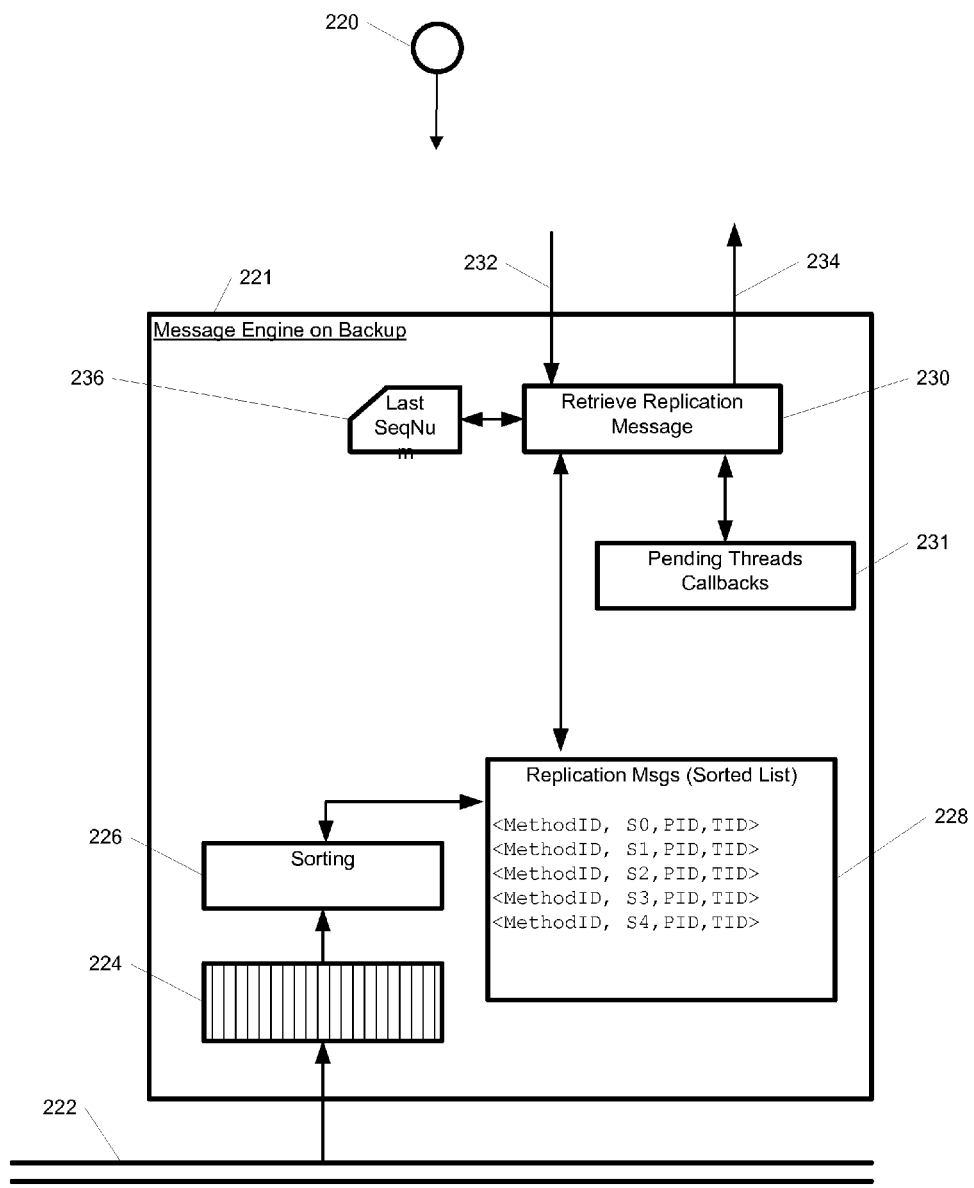
FIG.6 — A Backup's Messaging Engine

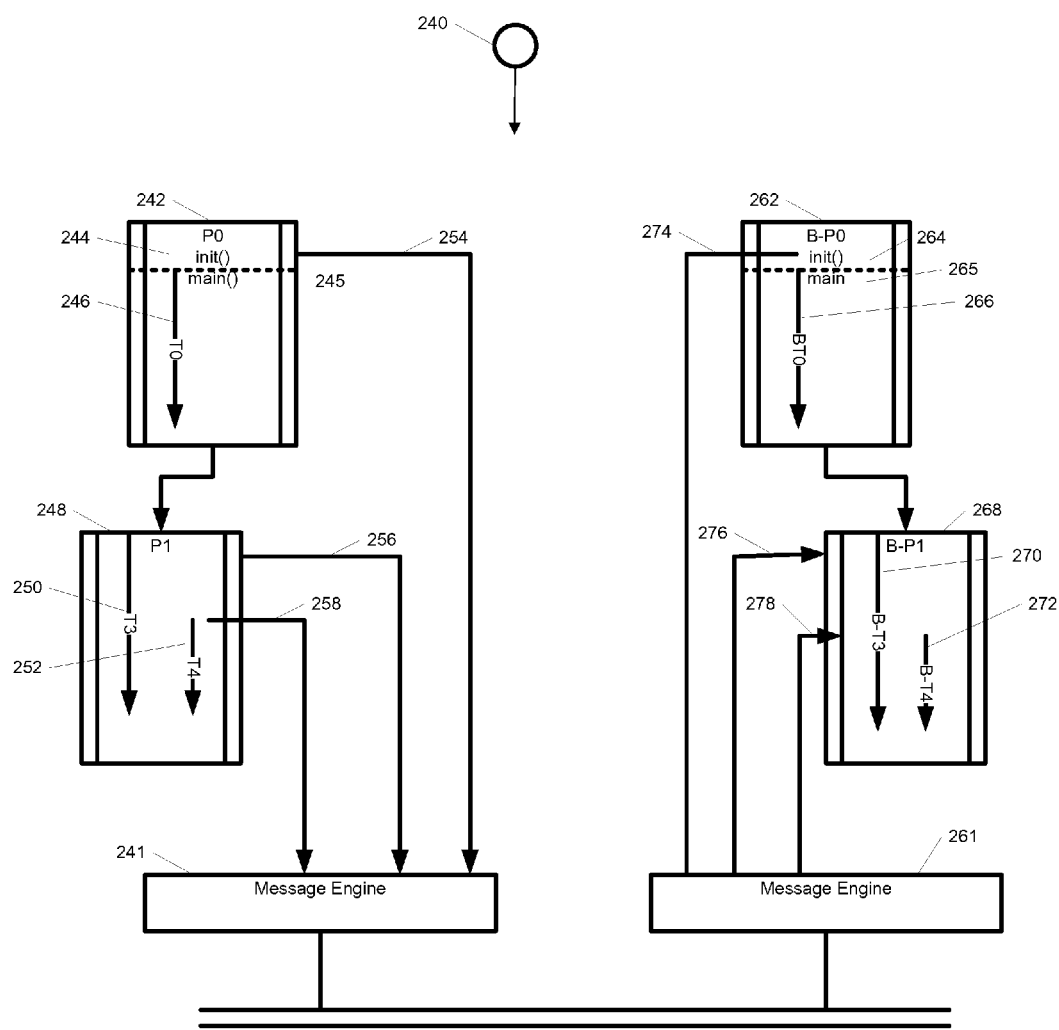
FIG.7 — Handling PROCESS messages

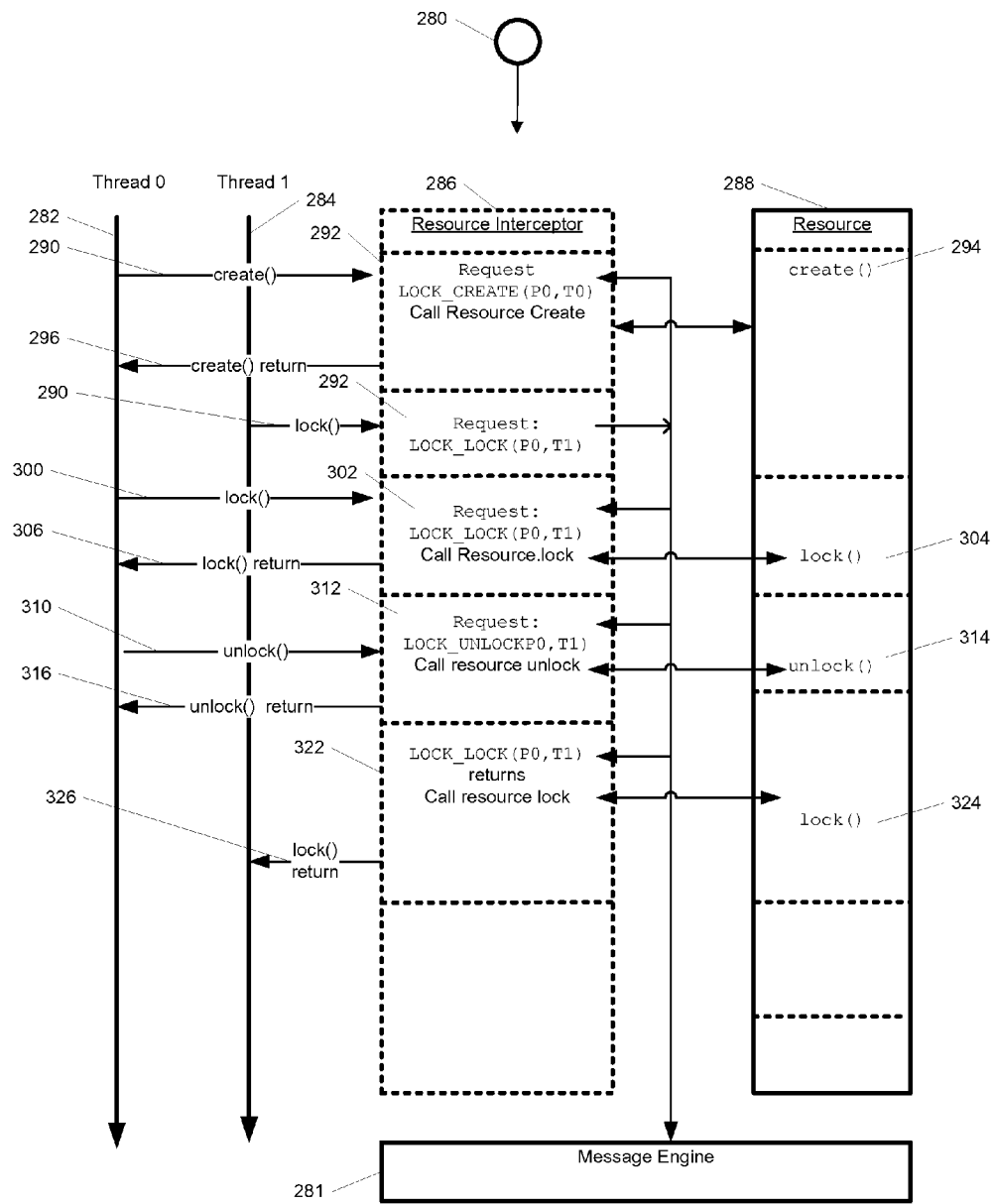
FIG.8 — A backup processing replication messages

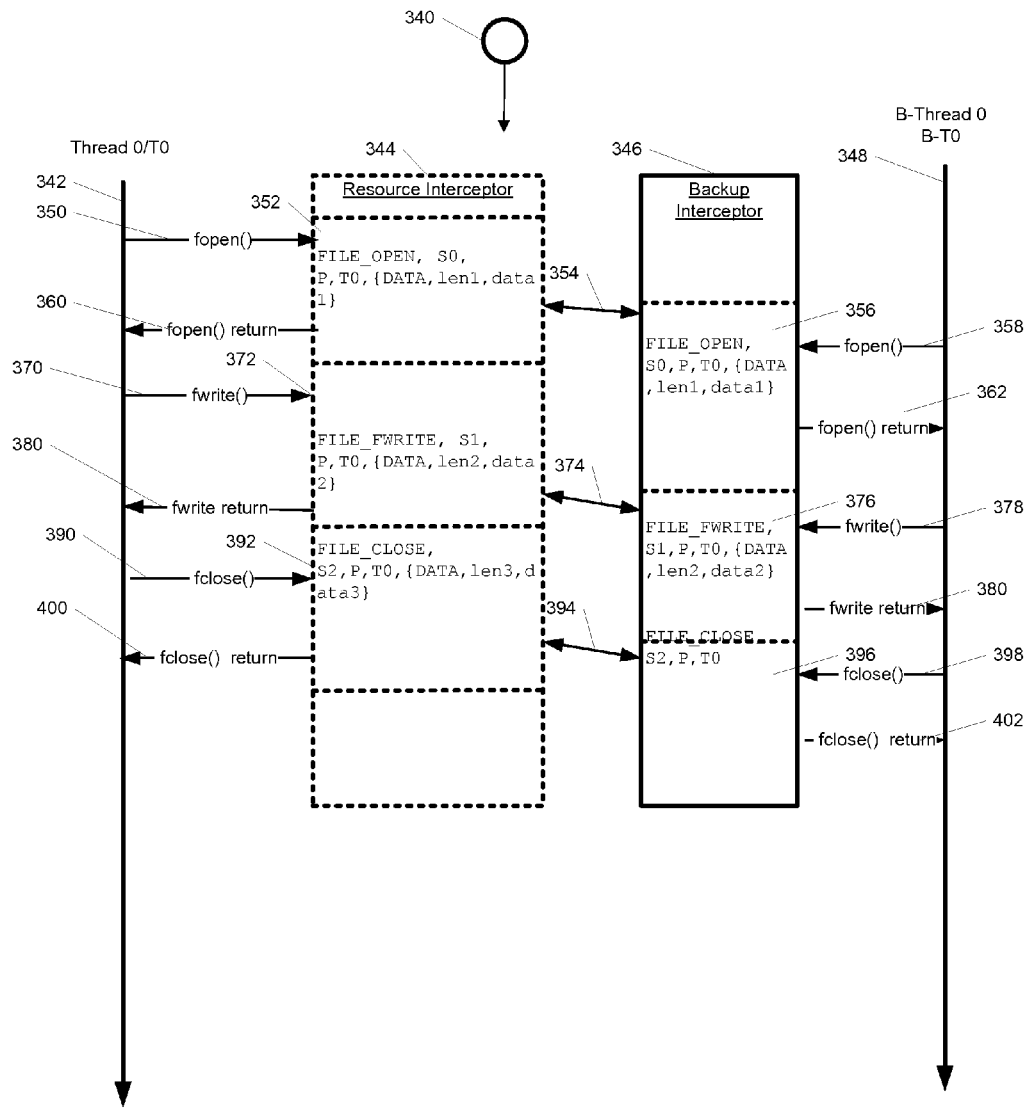
FIG.9 – I/O write processing

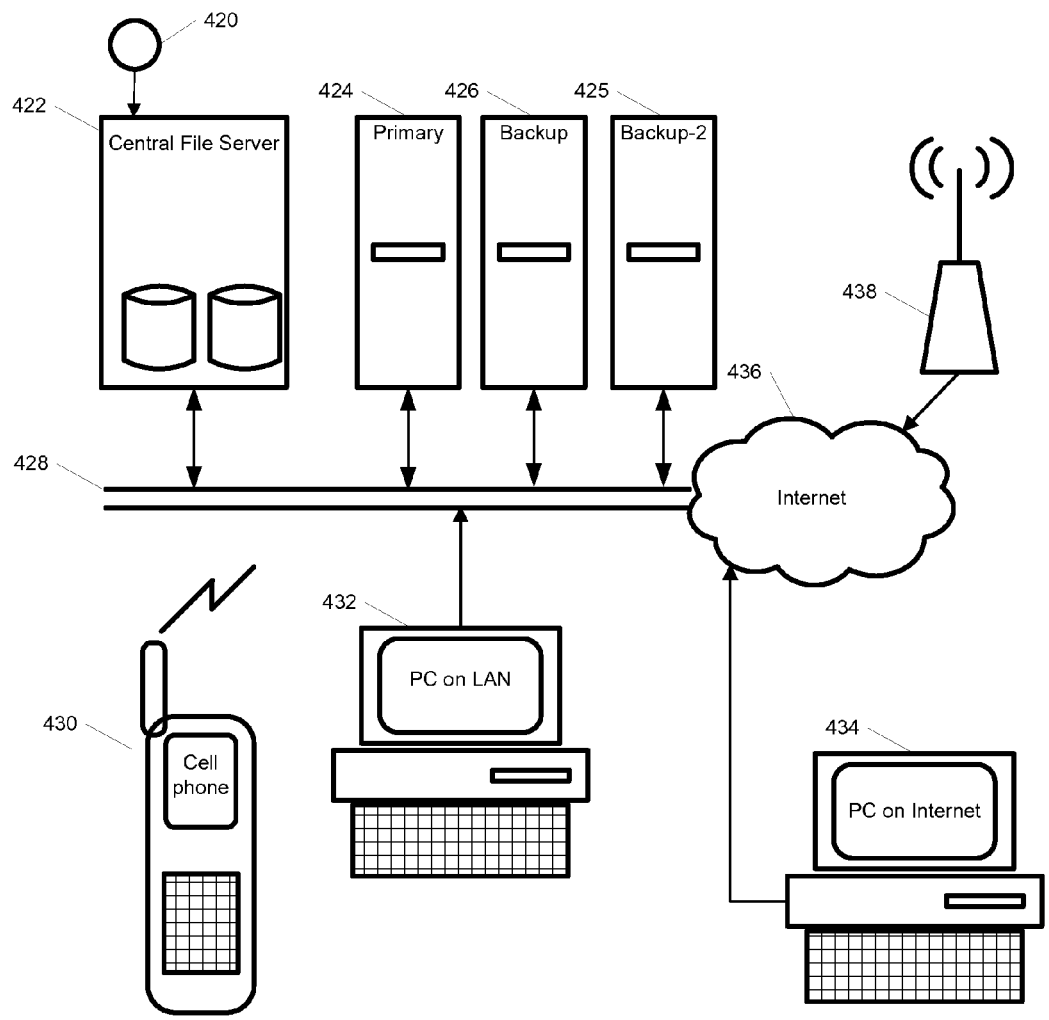
Fig.10 – Deployment scenarios

US 8,589,953 B1

SYSTEM AND METHOD FOR TRANSPARENT CONSISTENT APPLICATION-REPLICATION OF MULTI-PROCESS MULTI-THREADED APPLICATIONS

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains to software-based fault tolerant computer systems, computer networks, telecommunications systems, embedded computer systems, wireless devices such as cell phones and PDAs, and more particularly to methods, systems and procedures (i.e., programming) for consistent replication of application programs across two or more servers.

2. Description of Related Art

In many environments one of the most important features is to ensure that a running application continues to run even in the event of one or more system or software faults. Mission critical systems in telecommunications, military, financial and embedded applications must continue to provide their service even in the event of hardware or software faults. The auto-pilot on an airplane is designed to continue to operate even if some of the computer and instrumentation is damaged; the 911 emergency phone system is designed to operate even if the main phone system if severely damaged, and stock exchanges deploy software that keep the exchange running even if some of the routers and servers go down. Today, the same expectations of "fault-free" operations are being placed on commodity computer systems and standard applications.

Fault tolerant systems are based on the use of redundancy (replication) to mask faults. For hardware fault tolerance, servers, networking or subsystems are replicated. For application fault tolerance, the applications are replicated. Faults on the primary system or application are masked by having the backup system or application (the replica) take over and continue to provide the service. The take-over after a fault at the primary system is delicate and often very system or application specific.

Several approaches have been developed addressing the fundamental problem of providing fault tolerance. Tandem Computers (http//en.wikipedia.org/wiki/Tandem_computer) is an example of a computer system with custom hardware, custom operating system and custom applications, offering transaction-level fault tolerance. In this closed environment, with custom applications, operating system and hardware, a fault on the primary system can be masked down to the transaction boundary and the backup system and application take over seamlessly. The fault-detection and failover is performed in real-time.

In many telecommunication systems fault tolerance is built in. Redundant line cards are provided within the switch chassis, and if one line card goes down, the switching fabric automatically re-routes traffic and live connections to a backup line card. As with the Tandem systems, many telecommunications systems are essentially closed systems with custom hardware, custom operating systems and custom applications. The fault detection and failover is performed in real-time.

In enterprise software systems the general approach taken is the combined use of databases and high availability. By custom programming the applications with hooks for high-availability it is generally possible to detect and recovery from many, but not all, types of faults. In enterprise systems, it is typically considered "good enough" to recover the application's transactional state, and there are often no hard requirements that the recovery be performed in real-time. In general, rebuilding the transactional state for an application server can take as much as 30 minutes or longer. During this time, the application services, an e-commerce website for instance, is unavailable and cannot service customers. The very slow fault recovery can to some extent be alleviated by extensive use of clustering and highly customized applications, as evidenced by Amazon.com and ebay.com, but that is generally not a viable choice for most deployments.

In U.S. Pat. No. 7,228,452 Moser et al teach "transparent consistent semi-active and passive replication of multi-threaded application programs". Moser et al disclose a technique to replicate running applications across two or more servers. The teachings are limited to single process applications and only address replica consistency as it related to mutex operations and multi-threading. Moser's invention does not require any modification to the applications and work on commodity operating systems and hardware. Moser is incorporated herein in its entirety by reference.

Therefore, a need exists for systems and methods for providing transparent application-replication that address all types of applications, including multi-process multi-threaded application, application that use any type of locking mechanisms and application that access any type of external resources. Furthermore, the application-replication must be consistent and work on commodity operating system, such as Windows and Linux, and commodity hardware with standard applications.

BRIEF SUMMARY OF THE INVENTION

The present invention provides systems and methods for application-replication that is consistent, transparent and works on commodity operating system and hardware. The terms "Application-replication" or "replication" are used herein to describe the mechanism by which two copies of an application are kept running in virtual lock step. The application-replication in the present invention uses a leader-follower (primary-backup) strategy, where the (primary) application runs on the primary server and the backup application (also called the "replica") runs on a backup server. While it's possible to run the primary application and the backup application on the same physical server, the primary and backup are generally depicted as separate servers.

The primary application runs at full speed without waiting for the backup, and a messaging system, a key component of the present invention, keeps the backup application in virtual lock step with the primary.

A replication strategy is said to achieve "replica consistency" or be "consistent" if the strategy guarantees that the primary and backup application produce the same results in the same order. Replica consistency is critical with multi-process applications where the various parts of the application execute independently of each other. Replica consistency is a key element of the present invention and is explained in further detail below.

The term "virtual lock-step" is used to describe that the application and the application's replica produce the same results in the same order, but not necessarily at the same time; the backup may be behind.

The terms "primary" and "primary application" are used interchangeably to designate the primary application running on the primary host. The host on which the primary application is running is referred to as the "primary server", "primary host" or simply the "host" when the context is clear. The term "on the primary" is used to designate an operation or activity related to the primary application on the primary server.

Similarly, the terms "backup" and "backup application" are used interchangeably to designate a backup application running on a backup host. The host on which the backup application is running is referred to as a "backup server", a "backup host" or simply a "host" when the context is clear. The terms "on the backup" or "on a backup" are used interchangeably to designate an operation or activity related to a backup application on a backup server.

The following terms are used throughout the disclosures:

The terms "Windows" and "Microsoft Windows" is utilized herein interchangeably to designate any and all versions of the Microsoft Windows operating systems. By example, and not limitation, this includes Windows XP, Windows Server 2003, Windows NT, Windows Vista, Windows Server 2008, Windows 7, Windows Mobile, and Windows Embedded.

The terms "Linux" and "UNIX" is utilized herein to designate any and all variants of Linux and UNIX. By example, and not limitation, this includes RedHat Linux, Suse Linux, Ubuntu Linux, HPUX (HP UNIX), and Solaris (Sun UNIX).

The term "node" and "host" are utilized herein interchangeably to designate one or more processors running a single instance of an operating system. A virtual machine, such as VMWare, KVM, or XEN VM instance, is also considered a "node". Using VM technology, it is possible to have multiple nodes on one physical server.

The terms "application" is utilized to designate a grouping of one or more processes, where each process can consist of one or more threads. Operating systems generally launch an application by creating the application's initial process and letting that initial process run/execute. In the following teachings we often identify the application at launch time with that initial process. The term "application group" is utilized to designate a grouping of one or more applications.

In the following we use commonly known terms including but not limited to "client", "server", "API", "java", "process", "process ID (PID)" "thread", "thread ID (TID)", "thread local storage (TLS)", "instruction pointer", "stack", "kernel", "kernel module", "loadable kernel module", "heap", "stack", "files", "disk", "CPU", "CPU registers", "storage", "memory", "memory segments", "address space", "semaphore", "loader", "system loader", "system path", "sockets", "TCP/IP", "http", "ftp", "Inter-process communication (IPC), "Asynchronous Procedure Calls (APC)", "POSIX", "certificate", "certificate authority", "Secure Socket Layer", "SSL", MD-5", "MD-6", "Message Digest", "SHA", "Secure Hash Algorithm", "NSA", "NIST", "private key", "public key", "key pair", and "hash collision", and "signal". These terms are well known in the art and thus will not be described in detail herein.

The term "transport" is utilized to designate the connection, mechanism and/or protocols used for communicating across the distributed application. Examples of transport include TCP/IP, Message Passing Interface (MPI), Myrinet, Fibre Channel, ATM, shared memory, DMA, RDMA, system buses, and custom backplanes. In the following, the term "transport driver" is utilized to designate the implementation of the transport. By way of example, the transport driver for TCP/IP would be the local TCP/IP stack running on the host.

The term "interception" is used to designate the mechanism by which an application re-directs a system call or library call to a new implementation. On Linux and other UNIX variants interception is generally achieved by a combination of LD_PRELOAD, wrapper functions, identically named functions resolved earlier in the load process, and changes to the kernel sys_call_table. On Windows, interception can be achieved by modifying a process' Import Address Table and creating Trampoline functions, as documented by "Detours: Binary Interception of Win32 Functions" by Galen Hunt and Doug Brubacher, Microsoft Research July 1999". Throughout the rest of this document we use the term interception to designate the functionality across all operating systems.

The term "transparent" is used herein to designate that no modification to the application is required. In other words, the present invention works directly on the application binary without needing any application customization, source code modifications, recompilation, re-linking, special installation, custom agents, or other extensions.

To avoid simultaneous use of shared resources in multi-threaded multi-process applications locking is used. Several techniques and software constructs exists to arbitrate access to resources. Examples include, but are not limited to, mutexes, semaphores, futexes, critical sections and monitors. All serve similar purposes and often vary little from one implementation and operating system to another. In the following, the term "Lock" is used to designate any and all such locking mechanism. Properly written multi-process and multi-threaded application use locking to arbitrate access to shared resources The context of the present invention is an application on the primary server (primary application or the primary) and one or more backup applications on backup servers (also called the replicas or backups). While any number of backup-servers with backup applications is supported the disclosures generally describe the scenario with one backup. As is obvious to anyone skilled in the art this is done without loss of generality.

As part of loading the primary application interceptors are installed. The interceptors monitor the primary applications activities and sends messages to the backup. The backup uses said messages to enforce the primary's execution order on the backup thereby ensuring replica consistency.

A key element of the present invention is thus the combined use of interceptors and a messaging subsystem to provide replicate consistency.

Another aspect of the present invention is that the replicate consistency is achieved without requiring any application modifications. The application replication is provided as a system service and is fully transparent to the application.

Another aspect of the present invention is the use of sequence numbering to capture the execution stream of for multi process and multi threaded applications. Yet another aspect is the use of the sequence numbers on the backup to enforce execution that is in virtual synchrony with the primary.

A further aspect of the present invention is that it can be provided on commodity operating systems such as Linux and Windows, and on commodity hardware such as Intel, AMD, SPARC and MIPS. The present invention thus works on commodity operating systems, commodity hardware with standard (off the shelf) software without needing any further modifications.

One example embodiment of the present invention includes a system for providing replica consistency between a primary application and one or more backup applications, the system including one or more memory locations configured to store the primary application executing for a host with a host operating system. The system also includes an interception layer for the primary application intercepting calls to the host operating system and to shared libraries and generating replication messages based on said intercepted calls, a messaging engine for the primary application sending said replication messages to the one or more backup applications, and one or more additional memory locations are configured to store the one or more backup applications executing for one or more hosts each with a corresponding host operating system. The system further includes one or more additional messaging engines for each backup application receiving said replication messages from the primary application, and backup interception layers corresponding to each backup intercepting call to the operating system and shared libraries. The ordering information is retrieved from the one or more additional messaging engines for each backup application, and each intercepted operating system or shared library call is assigned a unique method ID, and each replication message contains at least the method ID, process ID, thread ID and a sequence number, and replica consistency is provided by imposing the same call ordering on backup applications as on the primary application.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL
VIEWS OF THE DRAWING(S)

The invention will be more fully understood by reference to the following drawings which are for illustrative purposes only:

FIG. 1 is a block diagram of the core system architecture for both primary and backups FIG. 2 is a block diagram illustrating a pair of primary and backup FIG. 3 is a block diagram illustrating Interception FIG. 4 is a block diagram illustrating creation of replication messages by the primary FIG. 5 is a block diagram illustrating the primary's messaging engine FIG. 6 is a block diagram illustrating the a backup's messaging engine FIG. 7 is a block diagram illustrating handling of PROCESS messages FIG. 8 is a block diagram illustrating a backup processing replication messages FIG. 9 is a block diagram illustrating I/O write processing FIG. 10 is a block diagram illustrating various deployment scenarios.

DETAILED DESCRIPTION OF THE INVENTION

Referring more specifically to the drawings, for illustrative purposes the present invention will be disclosed in relation to FIG. 1 through FIG. 10 It will be appreciated that the system and apparatus of the invention may vary as to configuration and as to details of the constituent components, and that the method may vary as to the specific steps and sequence, without departing from the basic concepts as disclosed herein.

0. Introduction

The context in which this invention is disclosed is an application running on a primary server and one or more replicated instances of the application running on one or more backup servers. Without affecting the general case of multiple replicated backup applications, the following disclosures often depict and describe just one backup. Multiple backups are handled in a similar manner.

Similarly, the disclosures describe one primary application. Multiple applications are handled in a similar manner. Likewise, the disclosures generally describe applications with one or two processes; any number of processes is handled in a similar manner. Finally, the disclosures generally describe one or two threads per process; any number of threads is handled in a similar manner 1. Overview FIG. 1 illustrates by way of example embodiment 10 the overall structure of the present invention for both primary and backups. The following brief overview illustrates the high-level relationship between the various components; further details on the inner workings and interdependencies are provided in the following sections. FIG. 1. Illustrates by way of example embodiment a primary and backup server 12 with an application 16 loaded into system memory 14. The application 16 is comprised of two processes; process A 18 and process B 20. Each of the two processes has two running threads. Process A contains thread T0 22 and thread T1 24, while process B is contains thread T3 26 and thread T4 28. An interception layer (IL) 30,32 is interposed between each application process and the Messaging Engine (ME) 34, the system libraries 36 and operating system 38. Process A's interception Layer 30 and Process B's interception Layer 32 use the shared messaging engine (ME) 34 to send and receive messages used to enforce replicate consistency.

System resources, such as CPUs 46, I/O devices 44, Network interfaces 42 and storage 40 are accessed using the operating system 38. Devices accessing remote resources use some form of transport network 48. By way of example, system networking 42 may use TCP/IP over Ethernet transport, Storage 40 may use Fibre Channel or Ethernet transport, and I/O may use USB.

In the preferred embodiment storage 40 is external and accessible by both primary and backups.

The architecture for the primary and backups are identical. At the functional level, the Messaging Engine 34 generally is sending out replication messages on the primary, while the ME 34 on the backup is receiving and processing replication messages sent by the primary.

FIG. 2 illustrates by way of example embodiment 60 a primary server 62 and its corresponding backup server 82 working as a pair of primary and backup. The primary application 64 is comprised of two processes; process A 66 and process B 68, each with two running threads. Process A's interception layer 70 and the Messaging Engine 74 are interposed between process A 66 and the operating system and libraries 76. Likewise, Process B's interception layer 72 and the Messaging Engine 74 are interposed between process B 68 and the operating system and libraries 76.

Using a similar architecture, the backup server 82 contains the backup application (the replica) 84 comprised of process A 86 and process B 88 each with two threads. The Interception Layers IL 90 for process A and IL 92 for process B are interposed together with the Messaging Engine 94 between the two processes and the system libraries and operating system 96.

As illustrated on both FIG. 1 and FIG. 2 there is one Messaging Engine per application. If an application contains multiple processes, the application processes share one message engine.

2. Interception

Interception is used to intercept all events, library calls and locking calls that affect replica consistency. FIG. 3 illustrates by way of example embodiment 100, the core interception architecture for an application with two processes. Details on the Messaging Engine and its architecture are given below. Process A 102 with interception layer 106, and process B 112 with interception layer 116. By way of example, ifunc1( ) and ifunc2( ) are subject to interception. When process A 102 reaches ifunc1( ) it is intercepted 108 and the call redirected to the interception layer 106. The interception layers processes the ifunc1( ) calls as follows (in pseudo code)

Call ifunc1( ) and store return values
Collect ThreadID and ProcessID related to ifunc1( )
Call Message Engine 122 with (MethodID, ThreadID, ProcessID) and any data from ifunc1( ) as necessary
Return to caller 110

Upon returning to the caller 110 Process A resumes execution as if ifunc1( ) had not been intercepted.

The interception mechanism is identical for process B 112, where ifunc2( ) 114 is intercepted 118, the interception processed 116 with the same algorithm, and then returned 120 to the caller.

In a preferred embodiment the interception layer is implemented as a shared library and pre-loaded into each application process' address space as part of loading the application. Shared libraries are implemented in such as way that each instance of the interception layer share the same code, but have their own private data. In a multi-process application the interception layer is therefore comprised of one interception layer per application process, and together the process-level interception layers comprise the interception layer for the entire application.

A related issue with interception is that intercepted functions may call other intercepted functions. As long as said calls are performed using public intercepted names, the previous teachings fully describe the interception. At times shared-library developers take shortcuts and don't use the public names, but refer directly to the implementation using a private name. In such cases, the interceptor must overlay a copy of the intercepted shared library code using fully resolved public function names.

3. Replica Consistency

Even with correctly written multi-process and multi-threaded programs, there are no guarantees that the same program run multiple times produces the same result at each run. By way of example consider an application consisting of two threads. The program contains one global variable, one global lock, and two threads to operate on the global variable. In pseudo code:

```
main( )
{
    int globalInt = 0;
    Lock globalLock = new Lock( );
    Start thread1;
    Start thread2;
    Print("Final value=" + globalInt);
}
private thread1( )
{
    for(int i=0; i< 10; i++)
    {
        globalLock.lock( );
        globalInt = globalInt + 1;
        globalLock.unlock( );
        sleep(random( ));
    }
}
private thread2( )
{
    for(int i=0; i< 10; i++)
    {
        globalLock.lock( );
        globalInt = globalInt * 2;
        globalLock.unlock( );
        sleep(random( ));
    }
}
```

Thread 1 repeats the core loop 10 times and each time first locks the global lock to ensure atomic access to globalInt, increments globalInt by one, frees the lock and waits a random amount of time. Thread2 has the same structure except it multiplies globalInt by 2.

Depending on how long each thread sleeps each time they reach sleep( ) thread1 and thread2 will execute their locks in different orders and thus globalInt is not guaranteed to be the same at the end of separate runs To ensure replica consistency, the present invention enforces an ordering on events, so that the primary and backup produces the same results. Specifically, if the application runs on the primary and produces a final value of 10, so will the backup. If next time the primary produces the final value of 10240, so will the backup.

While the use of sleep( ) highlighted the consistency problem, even without sleep( ) different runs would produce different final results. The reason is that the operating system schedules Tread 1 and Thread 2 based on a wide range of factors, and likely will make different scheduling decisions from run to run.

4. Generating Unique Global IDs

The present invention utilizes global IDs in several places. A "global ID" is a 64 bit integer that is guaranteed to be unique within the context of an application. When a new global ID is created it is guaranteed to be one larger than the most recently generated global ID and larger than any previously generated global ID. Global IDs are used as counters for messages. Global IDs start at zero upon initialization and continue to increase as more global IDs are requested. 64 bits ensures that integer wrap-around is not a practical concern. In an alternate embodiment global IDs are implemented as arbitrary precision integers, which can hold any size integer and never wrap.

In a preferred embodiment generation of global IDs are provided in a shared library. On some operating systems, shared libraries can have variables, called static library variables, or global library variables, that are shared across all instances of the shared library. For such operating system, the preferred implementation uses such global library variables to implement the global IDs. In pseudo code the implementation is, where "m_GlobalID" is the global shared variable:

```
static Int64 m_GlobalID=0;
Lock m_GlobalIDLock=new Lock( );
static int64 createGlobalID( )
{
Int64 id=m_GlobalID;
m_GlobalIDLock.lock( );
m_GlobalID=m_GlobalID+1;
id=m_GlobalID;
m_GlobalLock.unlock( )
return id;
}
```

Alternatively, if the operating system doesn't support global variables within shared libraries, the same functionality can be implemented using shared memory, using, by way of example, the POSIX shared memory subsystem found on modern operating system. In stead of using a static int 64 to hold the m_GlobalID, the m_GlobalID is placed in a shmem segment shared among all instances of the shared library and locked using a named semaphore This alternate technique is substantially identical to the algorithm above other than the use of shared memory in stead of library static variable In a preferred implementation the global ID functionality is built into to the Messaging Engine shared library. In an alternate implementation, the global ID functionality is provided in a separate shared library. In the following disclosures the global ID functionality is depicted as being provided by the Messaging Engine shared library, per the preferred implantation.

5. Identifying Resources

As a thread executes it proceeds along a unique path. Generally a thread runs within the context of a process. The process has a unique identifier, called the process ID or PID, and each thread has a unique identifier called the thread ID or TID. In some operating systems thread IDs are globally unique, in others unique within the context of its parent process. The combination of PID and TID uniquely identifies a thread and process pair independently of whether TIDs are globally or process unique. On many operating systems the PID is determined by the getpid( ) or GetProcessId( ) functions, while the TID is determined by the gettid( ) or GetThread Id( ) functions. Other operating systems offer similar functionality.

As an application is loaded control is first transferred from the loader to the applications init( ) method. Generally, init( ) is provided as part of the standard system libraries but custom init( ) may be provided. Init( ) ends by calling the main application entry point, generally called main( ). As main( ) starts executing it does so as one process with a single thread. The teachings of the present invention follow this model where each process automatically is created with one thread, where said thread is executing the initial program code. There are operating systems where every thread must be created programmatically and where no initial thread is attached to a process. The present invention supports adding threads to a running process at any time, and it's thus apparent to anyone skilled in the art that the following disclosures easily adapt to the case where a thread needs to be programmatically added following process creation.

In the preferred embodiment, the present invention supplies a custom init( ) wherein all interceptors are loaded. This ensures that all resources, including threads and processes, can be intercepted and that the interceptors are installed before the application's main( ) is called.

The process and thread interceptors intercept all process and thread creation, termination and exits. As the primary application executes and uses threads and processes, said events are communicated using Replication Messages (described below) to the backup providing the necessary information for the backup to rebuild the process and thread hierarchy and match it against incoming replication messages from the primary.

By way of example, as init( ) calls main( ), the programs consists of one process with one thread. Prior to calling main( ) a special initialization replication message (called PROCESS_INIT) with the initial process ID and thread ID is sent to the backups. When a new process is created the new process ID together with its initial thread ID are sent to the backup in a replication message (PROCESS_CREATE). Whenever a new thread is created, a replication message with the process ID and new thread ID are sent to the backup (THREAD_CREATE). Likewise, whenever a process or thread terminates a replication message with the terminating process and thread is sent to the backups. The backup can thus build a representation of the process and thread hierarchy on the primary and use that to map incoming replication messages against the backup's own process and thread hierarchy.

To ensure replica consistency, access to all resources is intercepted and tagged, so that the identical access sequence can be imposed on the replica. The first set of interceptors intercept all process and thread creation and termination calls. Tracking the process and thread hierarchy on the primary enables recreation of the hierarchy on the replica. The process and thread <PID,TID> pair is attached to all resource access performed on process PID and thread TID and provides the tagging necessary to associate resources interceptors on the backup with the corresponding process and thread on the primary By way of example consider a process with two threads. The two threads access a shared lock and arbitrate for access using the lock( ) and unlock( ) methods. In pseudo code

```
Lock globalLock = null;
private thread1( )
{
    globalLock = new Lock ( );// create
    globalLock.lock( );
    // do thread 1 work
    globalLock.unlock( );
}
}
private thread2( )
{
    globalLock.lock( );
    // do thread 2 work
    globalLock.unlock( );
}
}
```

FIG. 4 illustrates by way of example embodiment 140, the interception of Lock objects in a scenario with two threads and the creation of <PID,TID> pairs. A process is comprised of two threads, Thread-0 142 and Thread-1 144. The resource interceptor 146 intercepts access to the underlying Lock resource 148. First Thread-0 142 creates 150 the lock. The create ( ) call is intercepted 152 by the resource interceptor 146. First the actual resource create ( ) 154 call is performed and the returning value stored. A replication message with the pair <PID,TID> is created and sent 156 to the Message Engine 141 for transmittal to the backup. Finally the creation call return 158 the results of the resource create ( ) call. Later the Thread-0 142 calls the lock( ) method 160 on the Lock object. The lock( ) is intercepted 162, and initially forwarded to the lock( ) call within the Lock object 164. The lock is returned to the interceptor 162, and a replication message with <PID, TID> is created and sent to the Messaging Engine. The lock is returned 168 to thread-0. At this point thread-0 has acquired the Lock and no other threads are can acquire it while the Lock is held by thread-0.

Later thread-1 144 calls the lock( ) method 172 on the Lock object. The lock( ) is intercepted 172 and initially is forwarded to the lock( ) call within the Lock object 174. The lock( ) 174 blocks as the lock is already acquired by Thread-0 and the call does not return to the interceptor and thread-1 144. Later thread-0 142 calls the unlock( ) method 180 on the Lock object. The unlock( ) is intercepted 182 and forwarded to the Lock object 184. The Lock object processes the unlock( ) 184 and returns to the interceptor 182. A replication message with <PID,TID> is created and sent to the Message Engine 141. The unlock( ) call returns 188.

Thread-2 can now acquire the lock 174 and the lock( ) call return 190 to the interceptor 192 where a replication message with the <PID,TID> pair is constructed and sent to the Messaging engine.

5.1 Resource Types

The present invention breaks resources down into distinct categories and handles each separately:

1. Processes and Threads and their Methods:

processes and threads methods are intercepted and used to build a mapping between processes and threads on the primary and backup.

2. Locks and their Methods:

Locks are intercepted and used to enforce replica consistency relative to locks and their use 3. I/O Resources and their Methods:

I/O (Input/Output) resources are resources writing data to locations outside the application or reading external data into the application. I/O Resource methods are intercepted and additional replication messages corresponding are added. Example I/O resource methods that write data include, but are not limited to, write( ) for files, srand(n) where the srand(s) sets the seed value for a random number generator, and sendmsg( ) from the sockets library. All three examples write data to a location outside the application proper. Example I/O resource methods that read data include, but are not limited to, read( ) for files, rand( ) to generate a random number, gettimeofday( ) and readmsg( ) from the sockets library. All four examples reads or generates external data and delivers it into the application proper.

4. Other and Special Cases.

All classes of resources are included in the teachings of the present invention. I/O Resources are the most general type of resource and provide additional information in the replication messages. Any resource not included in the first two groups is treated as an I/O resource even though the functionality may not be I/O related.

6. Replication Messages

For every resource type methods are identified and assigned unique pre-defined method ID. The method IDs are 64 bit integers. In the following method IDs are generally referred to by their logical name. By way of example, Lock method IDs may be assigned as indicated in the following pseudo code:

define LOCK_CREATE 100
define LOCK_LOCK 101
define LOCK_UNLOCK 102

In the following we generally use the name "LOCK_CREATE" in stead of the method ID, which is 100 (one hundred) for LOCK_CREATE.

The symbols in shared libraries are generally identified using the standard development tools on each platform. By way of example, the command 'nm' and the GNU libtools on Linux and most UNIXes are used to list all symbols. On Windows, the Microsoft Visual Studio suite offers similar tools. Other operating systems generally provide symbol exporting tools. Similarly, the API documentation and development tools for the respective platforms provide documentation on supported APIs and libraries. Finally, on open source platforms such as Linux, one can simply look at the source code.

Every time a resource is created, accessed, or used a replication message is created on the primary and sent via the messaging engine to the backup. The replication message contains the <PID,TID> pair identifying the resource, the method ID of the method currently being used, and a sequence number ensuring strict ordering of events. The sequence number is a global ID generated and added by the Messaging Engine. To distinguish the replication messages from the surrounding text it is at times enclosed in "<" and ">". Those special characters are not part of the replication messages and are used entirely for clarify of presentation.

Continuing the example embodiment referred to in FIG. 4, the messages generated by the Resource Interceptor, has a process ID of 'P', thread ID of T0 for Thread-0 142, and thread ID of T1 for Thread-1 144. By way of example we identify the sequence numbers as S0, S1, S2 etc.

LOCK_CREATE,S0,P, T0
LOCK_LOCK,S1,P, T0
LOCK_UNLOCK,S2,P, T0
LOCK_LOCK,S3,P, T1

The messages and the ordering implied by the ever increasing sequence numbers S0, S1, S2 and S3 describe the ordering, use and access of shared resources. If a library method exists in two variants with different signatures, each method is assigned its own method ID. By way of example, if Lock. lock( ) had two different signatures, and thread-1 144 used the alternate method, the replication messages would look like LOCK_CREATE,S0,P,T0
LOCK_LOCK,S1,P,T0
LOCK_UNLOCK,S2,P,T0
LOCK_LOCK2,S3,P,T1//2nd lock( ) implementation Where LOCK_LOCK2 is said 2nd implementation of the lock( ) method. As disclosed above, process and threads require special consideration and have their own replication messages. For a new process, the parent process' PID is encoded in the DATA block (described below), and for a new thread, the parent thread's TID is encoded in the DATA block.

By way of example, the process replication messages corresponding to a program starting, creating one new process called P1, then terminating P1, would be:

PROCESS_INIT,S0,P0,T0,
PROCESS_CREATE,S1,P1,T1,P0
PROCESS_EXIT,S2,P1,T1,

Where S0, S1 and S2 are the sequence numbers, P0 the process ID of the initial process, T0 the thread ID of the thread for P0. P1 is the process ID of the created process while T1 is the thread ID of the first thread in P1 The parent process's process IDs are placed in the DATA block. PROCESS_INIT is the special previously disclosed initialization message sent just prior to entering main( ).

At times a replication message optionally includes additional data. The data is appended in a DATA block and transmitted along with the core replication message. The DATA block contains the DATA identifier, a 64 bit long identifying the length of the data block, and the data itself. By way of example, a replication message for a FILE_WRITE operation may look like FILE_WRITE S0,P0,T1,{DATA,len,datablock}

DATA blocks are used primarily to send complex data such as data written to files, results of operations and success/failure of operations. The DATA blocks are primarily used with I/O Resources. The curly brackets "{" and "}" are not part of the message, they are used here for clarity of presentation.

7. Message Engine

FIG. 5 illustrates by way of example embodiment 200, the structure of the Message Engine 201 on the primary The base replication message is sent to the Message Engine 206 where it's received 212. A sequence number is requested 214 from the Sequence Number generator 210, and added to the message. The message is ready for transmission 218 to the backup over the network 219.

In the preferred embodiment the Sequence Numbers are generated with the preferred Global ID embodiment disclosed above.

The message engine on the backup receives all the replication messages and sorts them by sequence number. The sequence number in the replication message identifies the order in which events previously took place on the primary, and therefore must be imposed on the backup during execution. As disclosed above and illustrated on the example embodiment on FIG. 4, the resource interceptor relies on the underlying operating system and system libraries to supply the native resource access and locking, and then tags on the process, thread, resource and sequence numbers to identify the context and relative order.

FIG. 6 illustrates by way of example embodiment 220 the Message Engine 221 on a backup. Replication messages are received 224 over the network 222. Depending on underlying transport, Replication Messages may arrive out of order: In a preferred embodiment using TCP, TCP ensures message ordering. In an alternate preferred embodiment using UDP, there is no guarantee that messages arrive in the same order they were sent. In general, Replication Messages may thus arrive out of order and are therefore sorted 226 by sequence number. A sorted list of new messages 228 is maintained by the present invention within the Message Engine 221 on the backups. By way of example, a message with sequence number 100 is sent, followed by a message with sequence number 101, they may arrive out-of-order on the backup, so that the message with sequence number 101 arrives prior to the replication message with sequence number 100. The sorting step 226 ensures that the oldest replication message with lowest sequence number is kept at the top, while later messages are placed in their sorted order later in the list 228.

When the resource interceptors on the backup requests a replication message 232, the request is processed by the request module 230. The request module compares the sequence number at the top of the sorted list of replication messages 228 with the sequence number of the most recent message 236. If top of the list 228 has a sequence number of exactly one more than the most recent sequence number 236 the top-message is removed from the list and returned 234 to the calling interceptor and the last sequence number 236 updated to the sequence number of the just-returned message 234. If the top-message sequence number is more than one larger than the last sequence number 236, one or more replication messages are missing, and the request module 230 pauses pending the arrival of the delayed message.

By way of example, and in continuation of the example above, if the last sequence number is 99, and the message with sequence number 101 has arrived, while the message with sequence number 100 has not arrived, the request module 230 waits until the message with sequence number 100 has been received and placed at the top of the sorted list. Upon arrival of the replication message with sequence number 100, said message is removed from the top of the list 228 and returned 234 to the caller.

In order to receive a message, the caller 232 further specifies the type of message (MessageID), the process and thread IDs of caller. By way of example, to retrieve the replication message for LOCK_LOCK for process P0 and Thread T1, the retrieve call would supply parameters of LOCK_LOCK, P0 and T1. The combined use of sequence numbers, which ensure that only the oldest message is delivered, combined with the full calling context of P0 and T1 enables the Replication Request Module 230 to only return replication messages that are designated for the particular thread and process. If a thread requests a replication message and the particular message isn't at the top of the list, the thread is placed in a "pending threads callback" queue 231. As soon as the requested message is available at the top of the message list 228, the thread is removed from the "pending threads callback" queue 231 and the call is returned 234. The mechanism of pausing threads where the replication messages are not available or at the top of the message list 228 is what enables the present invention to enforce replica consistency on the backup even when processes and threads are scheduled differently on the backup than they were on the primary. Further teachings on the use of replication messages by the interceptors on the backups, and the access methods are disclosed next.

8. Processing Replication Messages on the Backup

The backup is launched and interceptors are installed in init( ) as disclosed above for the primary. On the backup, however, init does not immediately call main( ) rather it requests and waits for the PROCESS_INIT message from the primary before proceeding. Where the primary runs un-impeded and sends replication messages when accessing resources, the backup conversely stops immediately upon entering a resource interceptor and retrieves the replication message corresponding to the particular resource and event before proceeding.

Generally, operating systems may assign different process IDs, thread IDs, resource handles etc. each time an application is run. There is thus no guarantee that a particular application always gets the same process ID. This means that the initial process on the primary and the initial process on the backup may have different process IDs. Likewise for all other resources. To correctly map replication messages from the primary to the backup a mapping between primary resources and backup resource is created. This is accomplished by creating a mapping of process and thread IDs between the primary and the backup.

As the initial process is created and just prior to calling main, an replication message <PROCESS_INIT,S0,P0,T0> is created and sent to the backup. On the backup, the interceptor receives the PROCESS_INIT message and creates a mapping between P0 on the primary and the initial process (called B-P0) on the backup. Whenever a replication message arrives from process P0, the interceptor utilizes the mapping and concludes that this message is intended for process B-P0. The backup similarly makes a mapping between thread T0 on the primary and the corresponding thread on the backup B-T0.

In the preferred embodiment the messaging engine maintains the process and thread ID mappings. In an alternate embodiment the interceptors maintain the mappings In the preferred embodiment, the mapping between processes and threads on the primary <Pi,Ti> and their counterparts on the backups <B-Pi, B-Ti> are maintained using a hash table, with the <Pi,Ti> pair being the key and the pair <B-Pi,B-Ti> being the corresponding process/thread on the backup. In an alternate embodiment an in-memory database is used to maintain the mappings.

FIG. 7 illustrates by way of example embodiment 240 an application starting as one process P0 242. The application starts and gets to init 244 where interceptors are installed. Before calling main 245 the replication message 254<PROCESS_INIT S0,P0,T0> is created and sent to the Message engine 241. The initial process P0 contains one thread T0 246. At some point during execution a second process P1 248 is created. A replication message 256 <PROCESS_CREATE, S1,P1,T3,P0> is created designating the process, the initial thread T3 250, and the parent process P0. Said message is transmitted via the Messaging Engine 241. A second thread T4 252 is later created within the process P1. The corresponding replication message <THREAD_CREATE,S2,P1,T4,T3> is created 258 and transmitted via the message engine 241.

On the backup incoming replication messages are sorted by sequence number, as disclosed, above. The list of replication messages are
PROCESS_INIT,S0,P0,T0
PROCESS_CREATE,S1,P1,T3,P0
THREAD_CREATE,S2,P1,T4,T3

On the backup, the application is started 262 and gets to init 264 where interceptors are installed. Where the primary sends out the PROCESS_INIT message prior to calling main( ) the backup in stead requests the PROCESS_INIT message from the messaging engine 261. The message engine, after checking for sequence number consistency, delivers the message 274 <PROCESS_INIT S0,P0,T0> to init ( ) 264. The PROCESS_INIT replication message allows the backup to map its process ID of B-P0 to P0 and B-T0 to primary thread ID T0. Henceforth, whenever a replication message with process ID of P0 is received, the backup maps it to the process with ID B-P0. Likewise replication messages with thread ID of T0 are mapped to B-T0 on the backup. The backup proceeds to main 265 and proceeds to execute. Later during the single-threaded execution of B-P0 a second process B-P1 is created. The "process create" is intercepted as part of the interceptors for processes and threads. After creating the process B-P1 268 and the initial thread BT3 270 the message engine is called again. The request is for a <PROCESS_CREATE> message 276 with parent process P0. At the top of the list is <PROCESS_CREATE,S1,P1,T3,P0> which is the correct message, and its returned to the calling interceptor. The interceptor can now map P1 to B-P1 and T3 to B-T3. Later during the execution of thread B-T3a thread_create( ) is encountered. The thread is created and a THREAD_CREATE message is requested with process ID P1 and thread ID P3. At the top of the list is <THREAD_CREATE,S2,P1,T4,T3> which is the correct message and its returned 278 to the interceptor. The interceptor can now map thread ID T4 to B-T4 on the backup.

FIG. 8 illustrates by way of example embodiment 280, processing of the replication messages on the backup generated by the embodiment of the primary shown on FIG. 4. The replication messages generated by the primary were disclosed above as:
LOCK_CREATE,S0,P,T0
LOCK_LOCK,S1,P,T0
LOCK_UNLOCK,S2,P, T0
LOCK_LOCK,S3,P, T1

The following assumes that the process and thread mappings have been established as taught above and mapping thus exists between threads and processes on the primary and the backup. Thread-0 282 is the thread on the backup corresponding to thread-0 FIGS. 4-142 while Thread-1 284 is the thread on the backup corresponding to thread-1 FIG. 4-144. The interceptor for Lock 286 was installed during init( ) and the Lock resource is 288.

Initially, Thread-0 282 calls create( ) 290 to create the resource. The call is intercepted 292. The interceptor requests the replication message LOCK_CREATE for process P and Thread T0. The message is at the top of the message list in the messaging engine 281 and is returned to the interceptor. The interceptor proceeds to call the resource create( ) 294 and returns the resource to the calling thread 0 296.

By way of example, on the backup thread 2 284 is scheduled to run and thread 2 request the lock ( ) 290. The all is intercepted 292 and the message LOCK_LOCK for process P and thread T1 is requested. This message is not at the top of the list in the messaging engine 281 and thread T1 284 thus is blocked and the call not returned to the interceptor.

Thread 0 282 is then scheduled and requests a lock( ) 300 on the resource. The call is intercepted 302, and the message LOCK_LOCK for process P and thread T0 is requested. This is the message at the top of the message list 281 and is thus returned to the calling interceptor 302. The interceptor calls lock( ) in the resource 304 and returns the lock to the called 306. After using the lock'ed objected unlock 310 is called an intercepted 312. The replication message LOCK_UNLOCK for process P and thread T0 is requested and returned as it's at the top of the message list 381. The interceptor 312 calls the resource unlock( ) and the resource is unlocked.

Upon delivering LOCK_UNLOCK, P, T0 to the interceptor 312 the earlier request from thread 1 284 containing LOCK_LOCK, P, T1 is now at the top of the list in the messaging engine 281. The message is therefore returned to the interceptor 322 and lock ( ) is called in the resource 324. If Thread 1 282 has not yet called unlock ( ) 314 the resource lock 324 blocks until the resource is unlocked by thread 0. If thread 0 has unlocked the resource 316 the resource lock 324 would immediately succeed and return the interceptor 322. The lock is then returned 326 to the calling thread.

The present invention thus ensures that the lock ordering from the primary is enforced on the backup, even if the backup requests locks in a different order. It is readily apparent to anyone skilled in the art that the teachings extends to multiple locks, processes, threads and objects and that the teachings thus ensures replica consistency between the primary and backup.

9. I/O Resource Methods

The teachings so far focused on processes, threads and locks. I/O Resource methods may write data to locations outside the application proper. By way of example, the locations can be files on disk, locations in memory belong to the operating system or system libraries, or locations addressable over a network. The data written with writing methods persists beyond the write operation: data is stored in files, the seed for a random number generator affects future random( ) calls, and data written to a socket is received by the another application.

9.1 I/O Resources—Writing Data

Write operations generally cannot be repeated. By way of example, if data is appended to a file (a write operation) appending the data a second time produces a different file larger file with the data appended twice. This present invention addresses this issue by ensuring that the backup, by way of continued example, doesn't append the data to the file even though the primary performed an append write operation. Write operations on the backup are suppressed, i.e. the interceptors capture the results from the primary application and use those on the backup in stead of performing the actual write. This aspect of the present invention is explained in further detailed below.

The primary application run unimpeded and performs all write operations. The replication messages corresponding to write operations are similar to the ones used for locks. However, write operations may have return values indicating, by way of example, the number of bytes written, and may modify some of the parameters passed to the method of the write operation. This additional information is also packed into replication messages and sent to the backup using the DATA field in the replication messages

```
int main(void)
{
char const*pStr="small text";
FILE*fp=fopen("/home/user/newfile.txt", "w")
if (fp!=null)
    fwrite(pStr, 1, strlen(pStr),fp);
fclose(fp)
}
```

By way of example, the replication messages corresponding to the above example are:
FILE_FOPEN,S0,P,T0,{DATA,len1,data1}
FILE_FWRITE,S1,P,T0,{DATA,len2,data2}
FILE_FCLOSE,S2,P,T0,{DATA,len3,data3}

Many write operations, such as by way of example, fwrite on a FILE opened with 'w' are exclusive and behave like Locks: Only one thread can write to a particular file at any one time. The locking behavior is thus automatically handled, as the replication messages enforce the order of execution as it takes place on the primary, and thus forces the backup through the same locking steps in the same order.

The DATA block attached to FILE_FOPEN contains the return value of the fopen call, which is the file handle. The file handle (a pointer) from the primary is of no direct use on the backup, as the backup generally creates a different file handle. The contents of the FILE handle, however, contains important internal FILE state data such as current directory, time stamps of last access, and error conditions. The FILE handle is therefore sent to the backup so the backup can extract said internal state and set the FILE handle state on the backup to the values from the primary. By way of example, if (open ( ) fails on the primary, it is forced to fail on the backup, if (open ( ) succeeds on the primary, it should succeed on the backup.

The DATA block attached to FILE_FWRITE contains the size_t object with the number of objects successfully written and the FILE pointer. The count is sent to the backup in order for the backup to return the same return value as the primary and the FILE pointer is sent so that the backup can update its local FILE point to have the same internal state For every I/O operation that writes data the return value is encoded and transmitted in the DATA block along with the parameters. The encoding can be as simple as an ASCII representation of the data. As long as primary and backup agree on encoding any encoding can be used. In the preferred embodiment the data is encoded using XML and MIME. In an alternate embodiment a custom encoding is used.

The actual data written is not transmitted via a replication message. The replica already has a full running copy of the application and it can generate the data itself if need be.

Write operations on the backup are handled much like the previous teachings with one major exception. The actual write operation is suppressed, i.e. skipped, on the backup as it generally is not valid to repeat a write operation. The results produced on the primary are "played back" on the backup. The state is adjusted based on the primary's state as necessary.

FIG. 9 illustrates by way of example embodiment 340 the above outlined example of opening a file for writing, writing a string to the file, then closing the file. For clarify of presentation, the Message Engine is not shown on the diagram. FIG. 9 shows replication messages going directly from the interceptor on the primary 344 to the interceptor on the backup 346. It is however assumed that messages go through the messaging engine, are sorted by sequence number and delivered to the interceptors on the backup as previously disclosed. Similarly, the actual I/O resource is not shown on the diagram. The resource is responsible for writing similarly to the resource on FIG. 8 —288 as previously disclosed.

Referring to FIG. 9, the primary application consists of one thread T0 342 with the interceptor 344. The backup application likewise consists of one thread B-T0 348 and the resource interceptor 346. The primary application is launched as is the backup application.

The primary thread calls (open( ) and is intercepted 352. The (open( ) call is processed by the I/O resource (not shown as explained above) and the return value from (open is packaged into the DATA block and the replication message FILE_FOPEN,S0,P, T0,{DATA,len, data1} is sent 354 to the backup interceptor 346 via the messaging engine. This is followed by (open( ) returning 360 to the calling thread 342. On the backup the main thread B-T0 is processing and reaches fopen( ) 358, which is intercepted 356. The interceptor requests the FILE_OPEN replication messages and is delivered the matching FILE_FOPEN,S0,P, T0,{DATA,len, data1}. As disclosed previously, the backup doesn't open the file, rather it uses the data in the DATA block to determine the actual return value of (open( ) and to set the internal state of the FILE object. This is followed by returning 362 the return value to the calling thread 348. The backup application thus operates under the assumption that it has opened the file, even though it has only been presented with the results from the primary.

Later the primary thread 342 calls fwrite( ) 370 which is intercepted 372. The write operation is completed using the I/O resource and the results packed into the DATA block of the replication message FILE_FWRITE, S1, P, T0,{DATA, lent, data2 }. The replication message is sent 374 via the messaging engine and eventually retrieved by the interceptor on the backup 376. In the meantime the backup thread is executing and reaches the fwrite( ) 378 call, which is intercepted 376. The interceptor requests the FILE_FWRITE replication message and is delivered the above mentioned message when available. The data in the DATA block of the replication message is used to set the return value of fwrite( )

380, and to set the internal state of the FILE pointer; no actual write takes place. Upon returning to the main thread in the backup 348 the program continues under the assumption that a file has been written, even tough no writing took place on the backup.

Finally, the thread T0 342 calls fclose( ) 390, which is intercepted 392. The close operation is completed using the I/O resource and the result packed into the DATA block of the replication message FILE_FCLOSE, S2,P, T0,{DATA,len3, data3}. The replication message is sent 394 via the messaging engine and eventually retrieved by the interceptor 396 on the backup. This is followed by fclose( ) returning 400 to the calling thread. In the meantime the backup thread continues executing and calls fclose( ) 398, which is intercepted 396. The interceptor request the FILE_FCLOSE replication message and uses the data in the data block to set the return value and internal state of the FILE object. Said return value is returned via fclose( )'s return 402.

9.2 I/O Resources—Reading Data

For Read operations the same general technique is used. The primary application is responsible for all reading operations, while the backup receives a DATA block indicating the read operation results. For read operations the DATA block additionally contains the actual data read. The data is encoded along with return values and parameters using the preferred embodiment disclosed above. As with write-operations, and alternate embodiment with custom encoding is also considered.

```
int main(void)
{
int length=10;
char pStr[length];
int count=0;
FILE*fp=fopen("/home/user/newfile.txt", "r")
if (fp!=null)
    count=fread(pStr, 1,length, fp);
fclose (fp)
}
```

By way of example, which reads 10 (length) characters from a file generates the following replication messages FILE_FOPEN,S0,P, T0,{DATA,len1,data1}
FILE_FREAD,S1,P, T0,{DATA,len2,data2}
FILE_FCLOSE,S2,P, T0,{DATA,len3,data3}

The DATA block for FILE_FREAD is the only one which is substantively different from the previous FILE_FWRITE teachings. For FILE_FREAD the DATA block encodes the return value (count), the parameter (fp) and the content of buffer read (pStr).

Upon retrieving the FILE_FREAD replication message the interceptor for fread( ) on the backup updates the return value (count), updates the state of the local FILE object and copies the pStr from the DATA block into the pStr on the backup. The interceptor then returns the fread( ) to the calling thread. On the backup no data is read, rather the original fread( ) is intercepted and suppressed, and the data read by the primary is supplied to the interceptor which uses it in-lieu of reading the data.

While in some cases it would be possible to let the backup actually read the data directly and not pass it via replication messages that is not always the case. Some storage devices only allow one access at any one time, some storage device might be mounted for single user access, or the read operation might actually be from a location in primary local memory not accessible by the backup.

Similarly, for network read operations using, by way of example, sockets it's only possible to read/receive any particular message once. The backup does not have the ability to also read the incoming message.

Thus, in the preferred implementation, data read is passed via replication messages to the backup.

9.3 I/O Resources—Other

For read and write operations that affect system libraries similar teachings apply. By way of example, srand (unsigned int seed) initializes a random number generator with a chosen seed value. This is equivalent to a write operation to "a library memory location" and the corresponding replication message MATH_SRAND,S0,P0,T0,{DATA,len1,data1} has the seed value encoded within the DATA block. The seed value is thus passed to the backup.

By way of example, double rand( ) which generates a random number is similar to a read( ) operation in that it produces a number from the system library.

The corresponding replication message is MATH_RAND, S0,P0,T0,{DATA,len2,data2 }. The random number is encoded as the return value and passed via a replication message to the backup. When the backup program executes the rand( ) method call, it is presented with the value of rand( ) produced on the primary, and is not generating its own.

The general teachings are thus: for write operations the writes are performed on the primary and the results and parameters are sent to the backup using replication messages. For read operations the reads are performed on the primary and the results, parameters and data-read are sent to the backup using replication messages.

10. Deployment Scenarios

FIG. 10 further illustrates by way of example embodiment 420 a variety of ways the invention can be configured to operate.

In one embodiment, the invention is configured with a central file server 422, primary server 424 and backup server 426. The primary server 424 runs the primary application and the backup server runs the backup application. The primary 424 and backup 426 are connected to each other and the storage device 422 via a network 428. The network is connected to the internet 436 for external access. In another embodiment the primary server 424 is replicated onto two backup servers; backup 426 and backup-2 425.

In one embodiment a PC client 432 on the local network 428 is connected to the primary application while the backup application is prepared to take over in the event of a fault. In another embodiment a PC 434 is configured to access the primary application server 424 over the public internet 436. In a third embodiment a cell phone or PDA 430 is accessing the primary application 424 over wireless internet 438,436. The present invention is configured to server all clients simultaneously independently of how they connect into the application server; and in all cases the backup server is continuously replicating prepared to take over in the event of a fault Finally, as the interceptors and messaging engine are components implemented outside the application, the operating system and system libraries, the present invention provides replication consistency without requiring any modifications to the application, operating system and system libraries.

The just illustrated example embodiments should not be construed as limiting the scope of the invention but as merely providing illustrations of some of the exemplary embodiments of this invention

11. Conclusion

In the embodiments described herein, an example programming environment was disclosed for which an embodiment of programming according to the invention was taught. It should be appreciated that the present invention can be implemented by one of ordinary skill in the art using different program organizations and structures, different data structures, and of course any desired naming conventions without departing from the teachings herein. In addition, the invention can be ported, or otherwise configured for, use across a wide-range of operating system environments.

Although the description above contains many details, these should not be construed as limiting the scope of the invention but as merely providing illustrations of some of the exemplary embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A system for providing replica consistency between a primary application and one or more backup applications, the system comprising:
   computer system memory comprising one or more memory locations configured to store the primary application;
   one or more Central Processing Units (CPUs) operatively connected to said computer system memory and configured to execute said primary application on a host with a host operating system;
   an interception layer on the primary application configured to intercept calls to the host operating system and to shared libraries and configured to generate replication messages based on said intercepted calls;
   a messaging engine for the primary application sending said replication messages to the one or more backup applications;
   one or more backup hosts each with a host operating system and each comprising: computer system memory comprising one or more memory locations configured to store one or more backup applications, and one or more Central Processing Units (CPUs) operatively connected to said computer system memory and configured to execute said one or more backup applications;
   one or more additional messaging engines for each backup application configured to receive said replication messages from the primary application; and
   backup interception layers corresponding to each backup application configured to intercept calls to the operating system and shared libraries, wherein information to be ordered is retrieved from the one or more messaging engines for each backup application,
   wherein each intercepted operating system or shared library call is assigned a unique method identifier, and each replication message contains at least the method identifier, process identifier, thread identifier and a sequence number, and replica consistency is provided based on the ordered information for each backup application as on the primary application; and
   wherein a call order of the primary application is imposed for said each backup application when incoming replication messages are sorted by sequence number, and replication messages are delivered with matching method, process and thread identifiers with a sequence number exactly one larger than the most recent delivered message.

2. The system according to claim 1, wherein said operating system is one of Linux®, UNIX® or Microsoft Windows®.

3. The system according to claim 1, wherein resource access ordering is encoded by increasing the sequence number by one on the primary application for each new replication message.

4. The system according to claim 1, further comprising:
   a pending thread callback queue memory where requests for replication messages without matching method identifier, process identifier, and thread identifier are placed until the oldest replication message matches said method identifier, process identifier, and thread identifier.

5. The system according to claim 1, wherein the interception layer for the primary application first calls the intercepted operating system or shared library, then creates and sends the corresponding replication message, and then returns a resource call to a calling application.

6. The system according to claim 1, wherein the interceptor for said each backup application first requests a replication message from the messaging engine, then calls the intercepted operating system or shared library, and then returns to a calling application.

7. The system according to claim 1, wherein sequence numbers are generated as globally unique identifiers for the application.

8. The system according to claim 1, where replication messages are sent from the primary application to said each backup application over one of Transmission Control Protocol (TCP/IP) or User Datagram Protocol (UDP).

9. The system according to claim 1, wherein the primary application and said each backup application are connected with one of a local area network, wide area network, Internet and a wireless network.

10. The system according to claim 1, wherein the interceptors and messaging engine are implemented without the need to modify one or more of the primary application, operating system or system libraries.

11. The system according to claim 1, wherein a resource access is a write operation, further comprising encoding the result of said write operation and the data structures of all parameters within a DATA block and including said DATA block in the replication message.

12. The system according to claim 11, wherein actual data written is not included in the replication message.

13. The system according to claim 11, wherein said each backup application suppresses said write operation and uses the DATA block from the primary application to update a return value and data structures of all parameters to match the primary application.

14. The system according to claim 11, wherein said write operation writes data to at least one of storage, system memory, network storage, network connection, and an external device.

15. The system according to claim 14, wherein said network is connected to one of a local area network, wide area network, Internet and a wireless network or a combination of the networks.

16. The system according to claim 11, wherein said encoding uses one of Extensible Markup Language (XML) or custom coding.

17. The system according to claim 11, wherein storage is mounted as shared storage for both primary application and each backup application.

18. The system according to claim 1, wherein a resource access is a read operation that encodes the results of said read operation, the data structures of all parameters, and the data read within a DATA block and including said DATA block in the replication message.

19. The system according to claim 18, wherein said each backup application suppresses said read operation and uses the DATA block from the primary application to update the return value, data structures and read data to match the primary application.

20. The system according to claim 18, wherein said read operation reads data from at least one of storage, system memory, network storage, network connection and an external device.

* * * * *